(12) United States Patent
Dalon

(10) Patent No.: US 6,663,085 B1
(45) Date of Patent: Dec. 16, 2003

(54) PORTABLE HAND-OPERATED LIFTING DEVICE

(76) Inventor: Phillip A. Dalon, 817 Creswell Ct., Knoxville, TN (US) 37919

(*) Notice: Subject to any disclaimer, the term of this patent is extended or adjusted under 35 U.S.C. 154(b) by 0 days.

(21) Appl. No.: 10/260,844

(22) Filed: Sep. 30, 2002

(51) Int. Cl.$^7$ .................................................. A01B 1/02
(52) U.S. Cl. .................................................. 254/131.5
(58) Field of Search ....................... 254/131.5; 294/54.5, 294/58, 59; 37/265, 285

(56) References Cited

U.S. PATENT DOCUMENTS

| | | |
|---|---|---|
| 2,419,015 A | 4/1947 | Gascoigne et al. |
| 2,769,612 A | 11/1956 | Weisheit |
| 4,461,458 A * | 7/1984 | Poulin ..................... 254/131.5 |
| 4,722,512 A | 2/1988 | Lighthizer |
| 4,881,332 A | 11/1989 | Evertsen |
| 5,120,098 A | 6/1992 | Childress |
| 5,669,651 A | 9/1997 | Vroegindewey |
| 5,732,933 A | 3/1998 | Champi |
| 5,871,058 A | 2/1999 | Naccarato et al. |
| 6,062,619 A | 5/2000 | Clark, Jr. |
| 6,086,049 A | 7/2000 | Shells |
| 6,203,081 B1 | 3/2001 | Kegan, Sr. |
| 6,276,665 B1 | 8/2001 | Hawkins et al. |

* cited by examiner

*Primary Examiner*—Robert C. Watson
(74) *Attorney, Agent, or Firm*—Pitts & Brittian, P.C.

(57) ABSTRACT

An apparatus for lifting, having a lever arm attached to a plate that can be temporarily fixed by an operator, and having a lifting head that can be swiveled and rotated relative to the plate. The lifting device includes a lifting head and a lifting arm having a handle at the end opposite the lifting head. A lever arm is attached between the lifting head and the lifting arm. The lever arm is pivotably and swivelly connected to a cleated foot plate. In one embodiment, the handle is adjustable in that the distance between the handle grip and the lifting head can be extended or shortened. In another embodiment, the angle of the lifting handle relative to the lifting arm is adjustable.

11 Claims, 5 Drawing Sheets

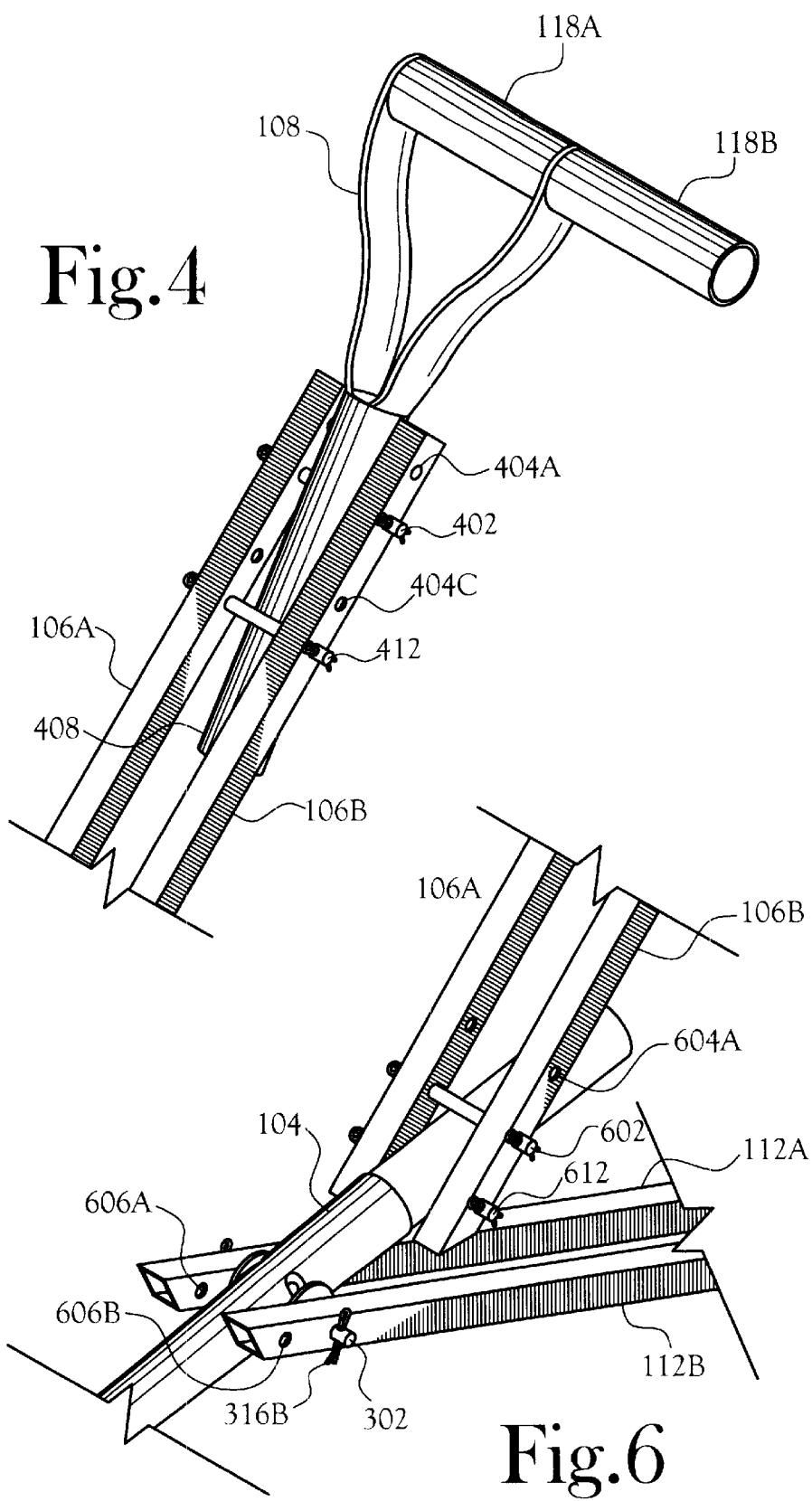

PORTABLE HAND-OPERATED LIFTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a portable lifting device. More particularly, this invention pertains to a device having a base and articulated arms for lifting and moving items with minimal effort by an operator.

2. Description of the Related Art

The standard shovel, spade, and snow scoop requires both hands of the operator and places great stress on the back of the operator. Various means for aiding the operator have been invented to ease the burden placed on the operator during lifting. These means include adding lever arms to the shaft and changing the shape of the shaft.

U.S. Pat. No. 2,419,015, issued to Gascoigne, et al., on Apr. 15, 1947, titled "Agricultural Implement," discloses a digging implement, such as a spade or fork, having a spring-loaded attachment that comes into contact with the surface after the implement is inserted into the ground. The implement has a shaft $A^1$ with a tool head A at one end and an extension handle $A^3$ at the other end. The extension handle $A^3$ is desirable because of the automatic action produced by the spring D.

Once the implement is in the ground, the attachment serves as a spring-loaded lever, allowing the implement to lift a quantity of soil. The attachment is fixed to the implement shaft $A^1$ with an eye $B^x$ engaging an eye $A^5$ on a collar $A^4$ fixed to the shaft $A^1$, which allows the implement shaft $A^1$ to tilt relative to the attachment and to rotate relative to the attachment. The lever action is due to the tilting allowed by the eye-in-an-eye assembly $A^5$–$B^x$, and it is assisted by the spring D, which adds a lifting force to the tool head A. A chain E is provided to limit the action of the spring D on the attachment. The raised soil load is dumped by swinging the implement shaft $A^1$ laterally and then rotating the shaft $A^1$, allowing the soil to slide off the tool head A. The Gascoigne, et al., tool has the disadvantage of not providing a stable connection at the shaft $A^1$ due to the inherent nature of the eye-in-an-eye assembly $A^5$–$B^x$.

Over the years following the issuing of the Gascoigne, et al., patent, various other patents have issued for digging tools with some form of lifting aid. A representative sampling includes the following. U.S. Pat. No. 4,461,458, issued to Poulin on Jul. 24, 1984, titled "Low Effort Digging and Lifting Tool," discloses a lever arm 28 pivotally connected to a shovel head 25 with a pivot 24. The lever arm 28 is pivotally connected to a foot plate 33 having a cleat 34.

U.S. Pat. No. 4,722,512, issued to Lighthizer on Feb. 2, 1988, titled "Hand Operated Digging Tool Comprising a Ground Penetrating Portion," discloses a lever arm 12 hingedly attached to the back of the shovel 10 adjacent to where the shovel 10 engages its handle 11. The lever arm 12 assumes a desired approximately 45° angle with the back of the shovel 10 because of the positioning of the extension 14, which projects from the lever arm 12 and contacts the back of the shovel 10. In operation, the lever arm 12 is held against the shovel handle 11 by a magnet 15. The lever arm 12 is released from the magnet 15 when the shovel 10 strikes the soil, as in digging, and the arm 12 is captured by the magnet 15 when the shovel is levered such that the shovel handle 11 is positioned parallel to the ground.

U.S. Pat. No. 4,881,332, issued to Evertsen on Nov. 21, 1989, titled "Shovel Lifting Aid," discloses another variation of a lifting lever 16 attached to a handle 11 of a shovel 12. The lifting lever 16 is attached to the shovel handle 11 by a pivot handle attachment mechanism 17. The mechanism 17 includes a sleeve 30 inside a sleeve 26. The inner sleeve 30 is secured to the handle 11 by a screw clamp 31, 32. The screw clamp 32 passes through a slot in the outer sleeve 26, thereby allowing the outer sleeve 26 to freely rotate about the inner sleeve 30.

U.S. Pat. No. 6,203,081, issued to Kegan, Sr. on Mar. 20, 2001, titled "Easy Lift Levered Shovel," discloses a levered fulcrum 18 pivotally attached to the shaft 16. The movable clamp 22 positions the levered fulcrum 18 at any point on the shaft 16 by way of a nut and bolt arrangement 24. The levered fulcrum 18 is spring-loaded by a spring 28 to maintain the fulcrum 18 in a nested position. The operator pivots the lever against the resiliency of the spring 28 rearwardly away from the shank 16 such that the fulcrum 18 rests on the ground.

An objective of this invention is to provide a lifting tool that requires minimal effort from the operator, provides a stable platform for the lifted load, and can be operated at a convenient height, minimizing bending by the operator.

It is a further objection of this invention to enable those confined to a wheelchair to lift items that otherwise would not be lifted.

BRIEF SUMMARY OF THE INVENTION

According to one embodiment of the present invention, a portable hand-operating lifting device is provided. The device includes a lifting head, which in one embodiment is a shovel blade, and a lifting shaft having a handle at the end opposite the lifting head. A lever arm is attached between the lifting head and the lifting shaft. The lever arm is pivotably and swivelly connected to a cleated foot plate. The foot plate has a lifting plate, which allows the operator to remove the foot plate from the surface and reposition the foot plate such that the lifting device can be used in a different location.

In one embodiment, the handle is adjustable in that the distance between the handle grip and the lifting head can be extended or shortened. In another embodiment, the angle of the lifting handle relative to the lifting shaft is adjustable. In still another embodiment, the angle of the lifting shaft relative to the lifting head is adjustable.

BRIEF DESCRIPTION OF THE SEVERAL VIEWS OF THE DRAWINGS

The above-mentioned features of the invention will become more clearly understood from the following detailed description of the invention read together with the drawings in which:

FIG. 4 is a perspective view of the lifting shaft and adjustable handle connection;

FIG. 6 is a perspective view of lifting shaft and lever arm connections to the lifting head shaft.

DETAILED DESCRIPTION OF THE INVENTION

Figure 1:
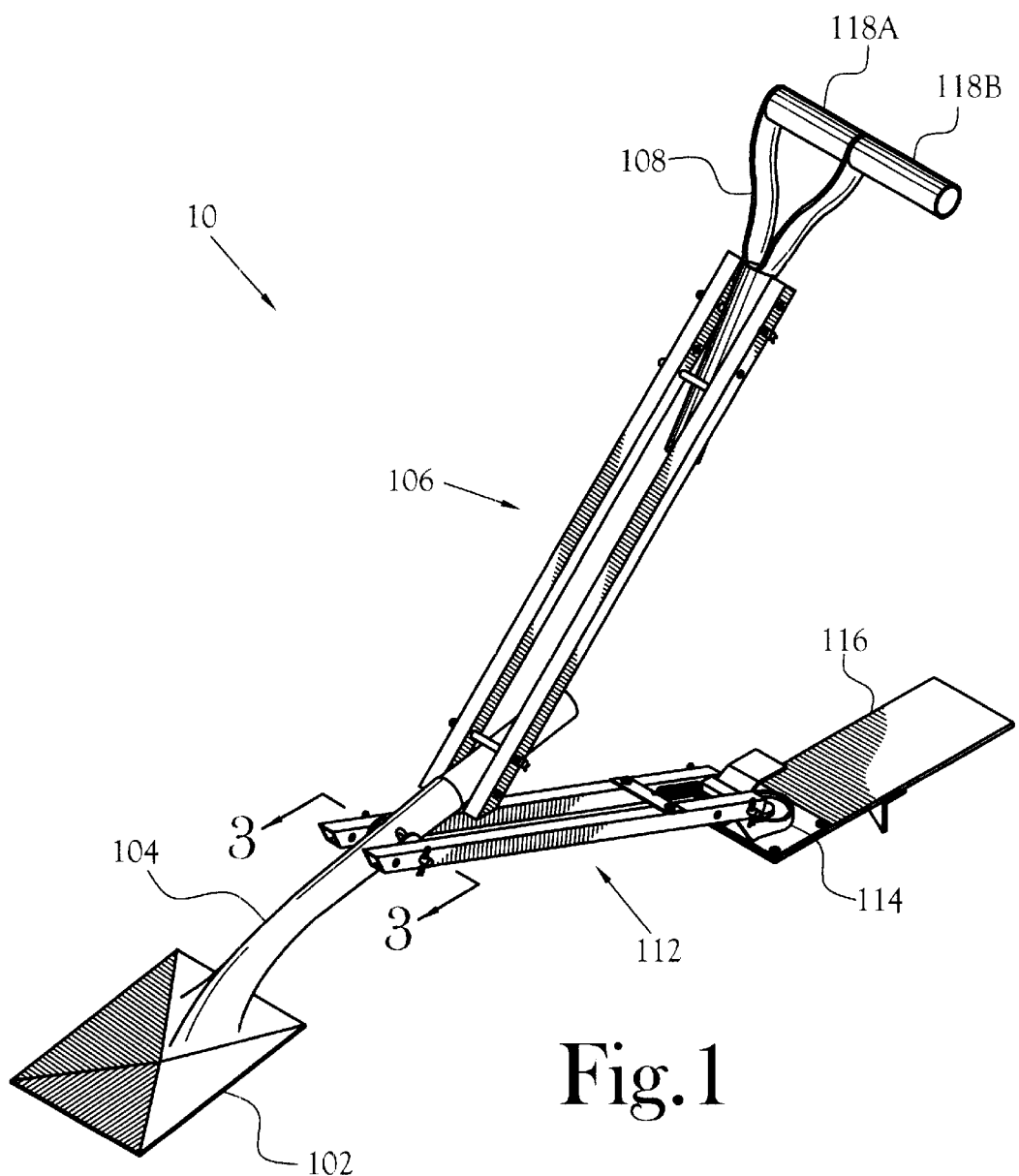
FIG. 1 is a perspective view of a lifting device.

A portable hand-operating lifting device 10 is disclosed. FIG. 1 illustrates a general perspective view of the lifting device 10, which includes a lifting head 102 with a lifting head shaft, or first member, 104 to which is attached a lever arm, or second member, 112, and a lifting arm, or third member, 106. The lifting arm 106 is attached to an adjustable handle 108. The handle 108 has a first hand grip 118A and the illustrated embodiment shows a second hand grip 118B extending from the first hand grip 118A such that an operator 210 can use two hands to grip the handle 108. The lever arm 112 is attached to a foot plate 116.

Figure 2:
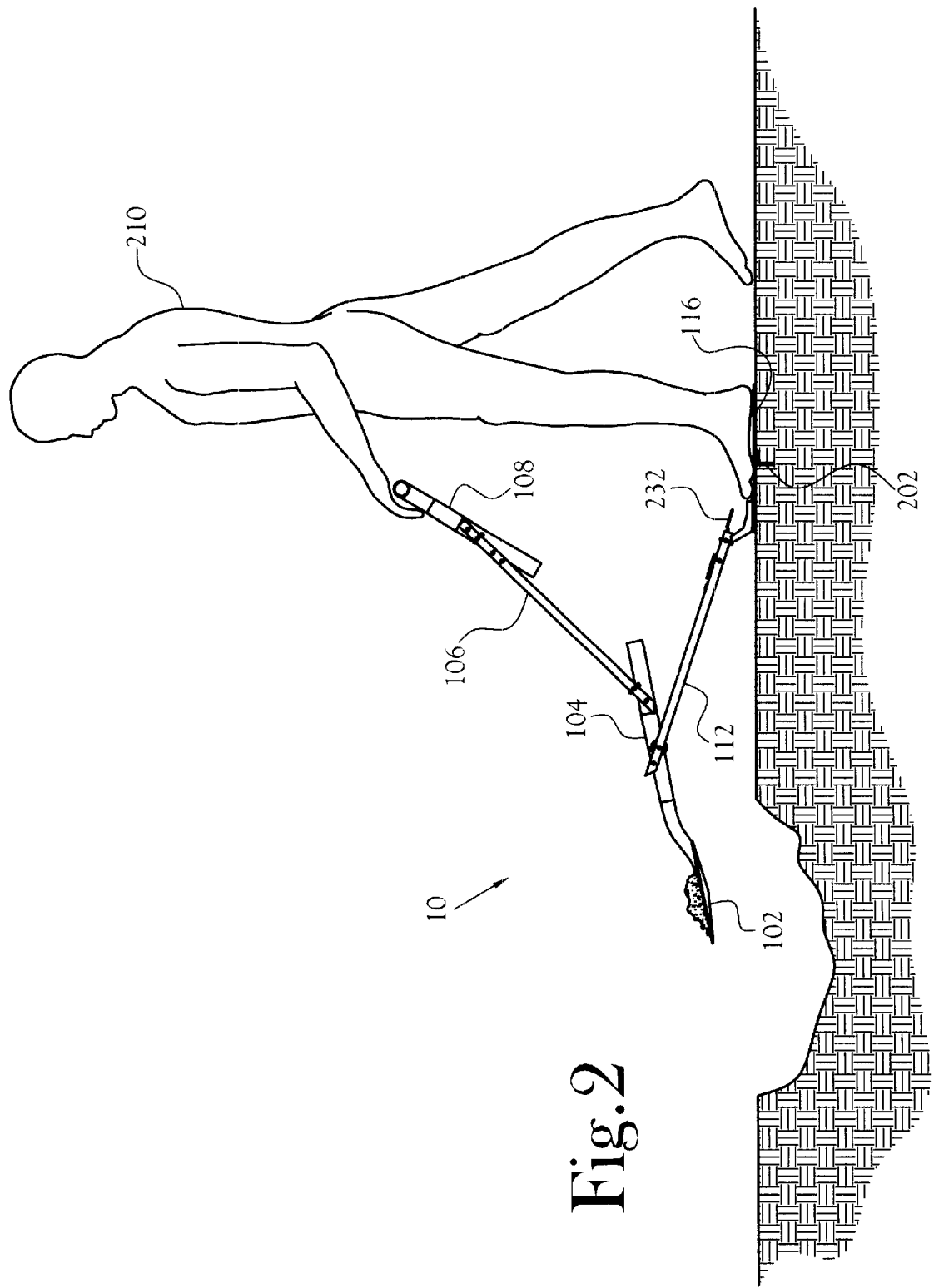
FIG. 2 shows the lifting device in operation.

FIG. 2 illustrates the lifting device 10 in operation as a digging tool. The operator 210 places a foot on the foot plate 116 and grasps the lifting handle 108. The lifting head 102 is positioned by the operator 210 grasping the hand grip 118 and manipulating the lifting handle 108. In the illustrated embodiment, the lifting head 102 is used to dig soil and deposit it to the side of the dug hole. The lifting head 102 is a shovel head and the operator 210 forces the head 102 into the ground by moving the handle 108 such that the head 102 is in contact with the ground and by pulling on the handle 108, using the operator's 210 bodyweight, thereby forcing the head 102 into the ground. The operator 210 then swings the handle 108 about the lever arm pivot point 514 (illustrated on FIG. 5) such that the head 102 follows an arc and lifts a quantity of soil away from the ground. The operator 210 swivels the device 10 with the load of soil about the swivel 512 on the foot plate 116. When the head 102 is positioned where the soil needs to be deposited, the operator 210 rotates the handle 108 about the axis of the shaft 104, thereby tilting the head 102 and letting the soil slide off the head 102. When the device 10 needs to be repositioned, the foot plate 116 is lifted from the surface by the operator 210 sliding his foot forward, placing his toes under the lift plate 232, and raising his foot, thereby lifting the foot plate 116. The foot plate 116 and cleat 202 comes free from the surface and is placed at the next location for digging.

In the illustrated embodiment, the lifting device 10 is a digging tool that requires no lifting by the operator 210. The illustrated embodiment is useful for digging sod, in addition to digging holes in the ground. The operator 210 stands on the foot plate 116 and positions the tip of the lifting head 102 such that the lifting head 102 and shaft 104 are almost vertical. If the ground is hard or tightly compacted, the operator 210 can step on the shovel head 102 in order to have the lifting head 102 "bite" into the ground. After the head 102 is positioned, the operator 210 pulls the handle 108 back and down. The head 102 will then enter the ground and follow a curved path, thereby digging up a spadefull of earth. After the lifting head 102 is loaded, the operator 210 pushes down and pulls back on the handle 108 to lift the head 102. The operator 210 pushes the handle 108 to one side or the other to position the head 102 for releasing the load of earth. After the head 102 is positioned, the operator 210 twists the handle 108, causing the head 102 to rotate and the earth to slide off the head 102.

Although the illustrated embodiment shows the device 10 as a digging tool, other uses of the device include lifting items on a floor and relocating the items. Those skilled in the art will recognize that the lifting head 102 can be a fork or a flat plate without departing from the spirit and scope of the present invention. The illustrated embodiment includes an adjustable lifting member 106 and an adjustable handle 108. The length and angle of the lifting member 106 and the handle 108 can be independently adjusted, thereby allowing the device 10 to be operated by persons of various heights. For example, by shortening the member and the handle and by reducing the angle to a minimum, the device 10 is suitable for use by an operator 210 confined to a wheelchair.

Figure 3A:
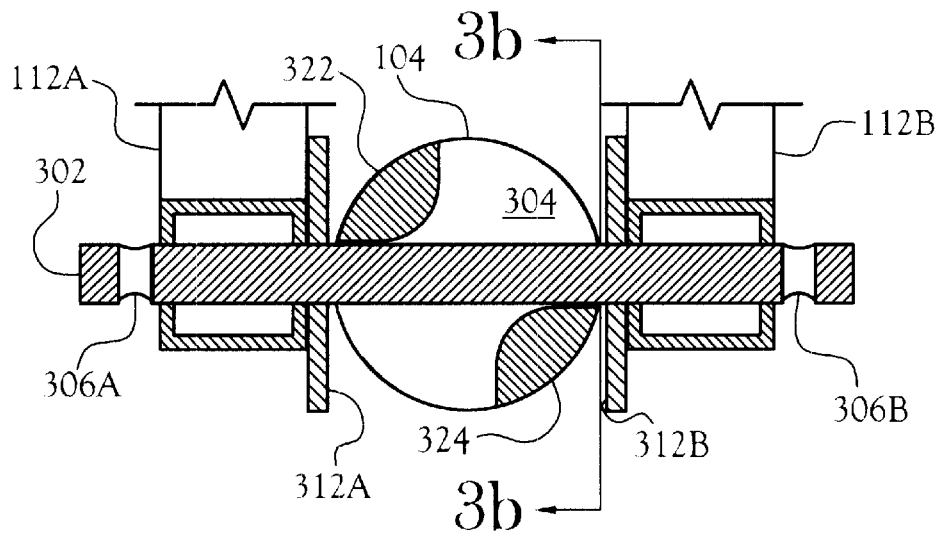
FIG. 3a is a cross-sectional view showing the lever arm attachment to the lifting head shaft.

FIG. 3a illustrates a cross-sectional view of the means for attaching the lever arm 112 to the lifting head shaft 104. The joint includes an opening 304 in the lifting head shaft 104 that permits a pivot pin 302 to move within the shaft 104. The opening 304, in one embodiment, is formed by drilling two holes, perpendicular to each other and to the shaft 104 axis, with the holes crossing at the center of the shaft 104. The material of the shaft 104 between the two holes is removed such that the pin 302, when inserted into the opening 304, can be rotated 90° about the axis of the shaft 104. This amount of rotation allows the lifting head 102 to be rotated from a horizontal position to a vertical position, thereby ensuring that anything supported by the head 102 will slide off when the head 102 is rotated. Those skilled in the art will recognize that the angle about the axis that the pin 302 rotates can vary without departing from the scope or spirit of the present invention. The angle must be less than 180° in order for some material to remain connecting the shaft 104 across the opening 304. The material remaining serves as stops 622, 324 for the pin 302 and provides structural strength to the shaft 104. In another embodiment, a sleeve (not illustrated) surrounding the shaft 104 has a pair of slotted openings corresponding to the opening 304 in the shaft 104 and provides additional strength to the shaft 104 in the area of the opening 304.

In the illustrated embodiment, the lever arm 112 is made up of a pair of side tube members 112A, 112B. In another embodiment, the lever arm 112 has a fork shape with the pair of side members 112A, 112B merging into a single member extending to the foot plate 116. The pivot pin 302 passes through aligned openings in the tube members 112A, 112B, which are located on opposite sides of the lifting shaft 104. Washers 312A, 312B are positioned between the shaft 104 and each of the tube members 112A, 112B and provide bearing surfaces between the shaft 104 and the tube members 112A, 112B. The pivot pin 302 is secured in place by cotter pins 316A, 316B (illustrated in FIG. 6), each inserted in an opening 306A, 306B at each end of the pin 302. Those skilled in the art will recognize that other means known in the art for securing an axel can be used without departing from the spirit and scope of the present invention.

Figure 3B:
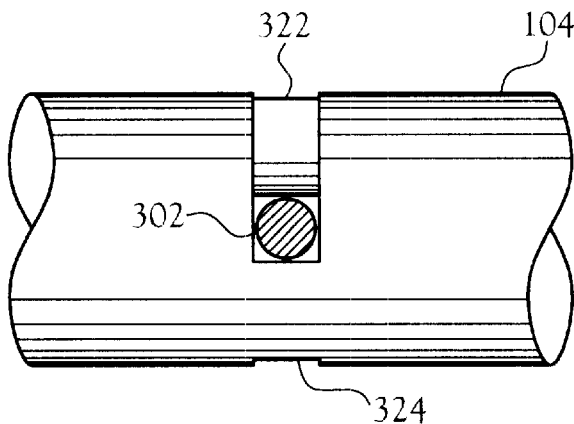
FIG. 3b is a cross-sectional view showing the pin through the lifting head shaft.

FIG. 3b is a side-section view of the pivot pin 302 residing in the opening 304 in the lifting head shaft 104. The opening 304 is bounded by a pair of flat, parallel surfaces perpendicular to the axis of the shaft 104 and by two stops 322, 324, which limit the rotation of the pivot pin 302 about the axis of the shaft 104. The opening 304, bounded by the stops 322, 324, has two slotted apertures along a circumference of the shaft 104. The pin 302 extends out of the two slotted apertures on opposite sides of the shaft 104. In the illustrated embodiment, the surfaces of the opening 304 are flat. In another embodiment, the surfaces parallel to the axis of the shaft 104 are rounded.

Figure 3C:
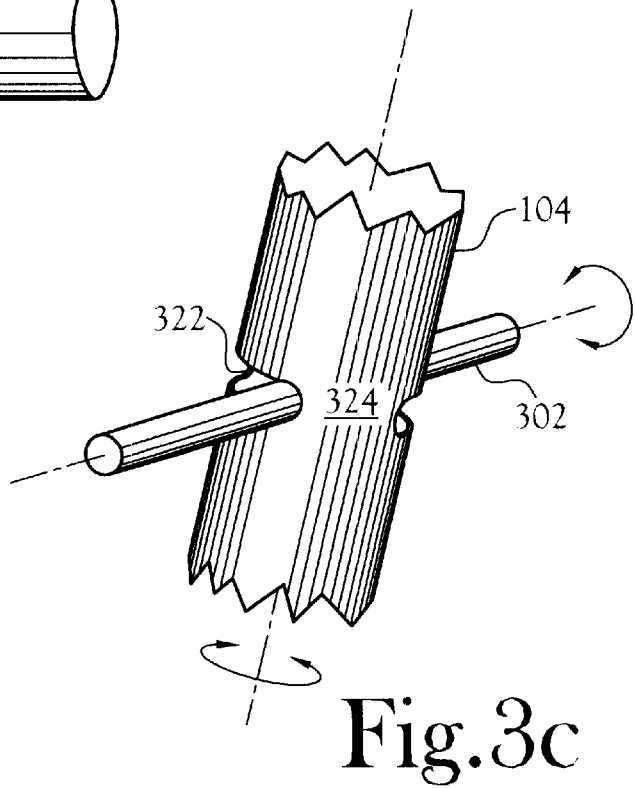
FIG. 3c is a perspective view of pin through the lifting head shaft.

FIG. 3c is a perspective view of the pivot pin 302 residing in the opening 304 in the lifting head shaft 104. The pivot pin 302 is free to rotate axially within the opening 304. The shaft 104 is free to rotate axially about the pivot pin 302; however, the shaft 104 is limited in its rotation by the stops 322, 324.

FIG. 4 illustrates the handle 108 attachment to the lifting arm, or member, 106, which is made up of a pair of tube members 106A, 106B. A first pin 402 secures the handle 108 to the lifting arm 106, and a second pin 412 is a stop to prevent the handle 108 from rotating beyond a certain point about the first pin 402 when the handle 108 is pushed down by the operator. In the illustrated embodiment, the handle 108 is adjustable. In another embodiment, the lifting arm 106 and the handle 108 are fixed relative to each other.

The lifting members 106A, 106B have aligned openings 404A, 404C (plus the openings through which pins 402, 412 are positioned), which allow the angle between the lifting member 106 and the handle 108 to be adjusted and also allow the combined length of the lifting member 106 and the handle 108 to be adjusted. In the illustrated embodiment, the pins 402, 412 are secured with cotter pins, although one skilled in the art will recognize that any of various means can be used to secure the pins 402, 412 in place.

FIG. 4 also illustrates the hand grips 118A, 118B on the handle 108. In the illustrated embodiment, two hand grips 118A, 118B are shown, allowing the operator 210 to use two hands for manipulating the handle 108. In another embodiment, the outboard hand grip 118B is positioned on the opposite side of the first hand grip 118A. In still another embodiment, the outboard hand grip 118B is not used and the operator 210 grips the first hand grip 118A.

Figure 5:
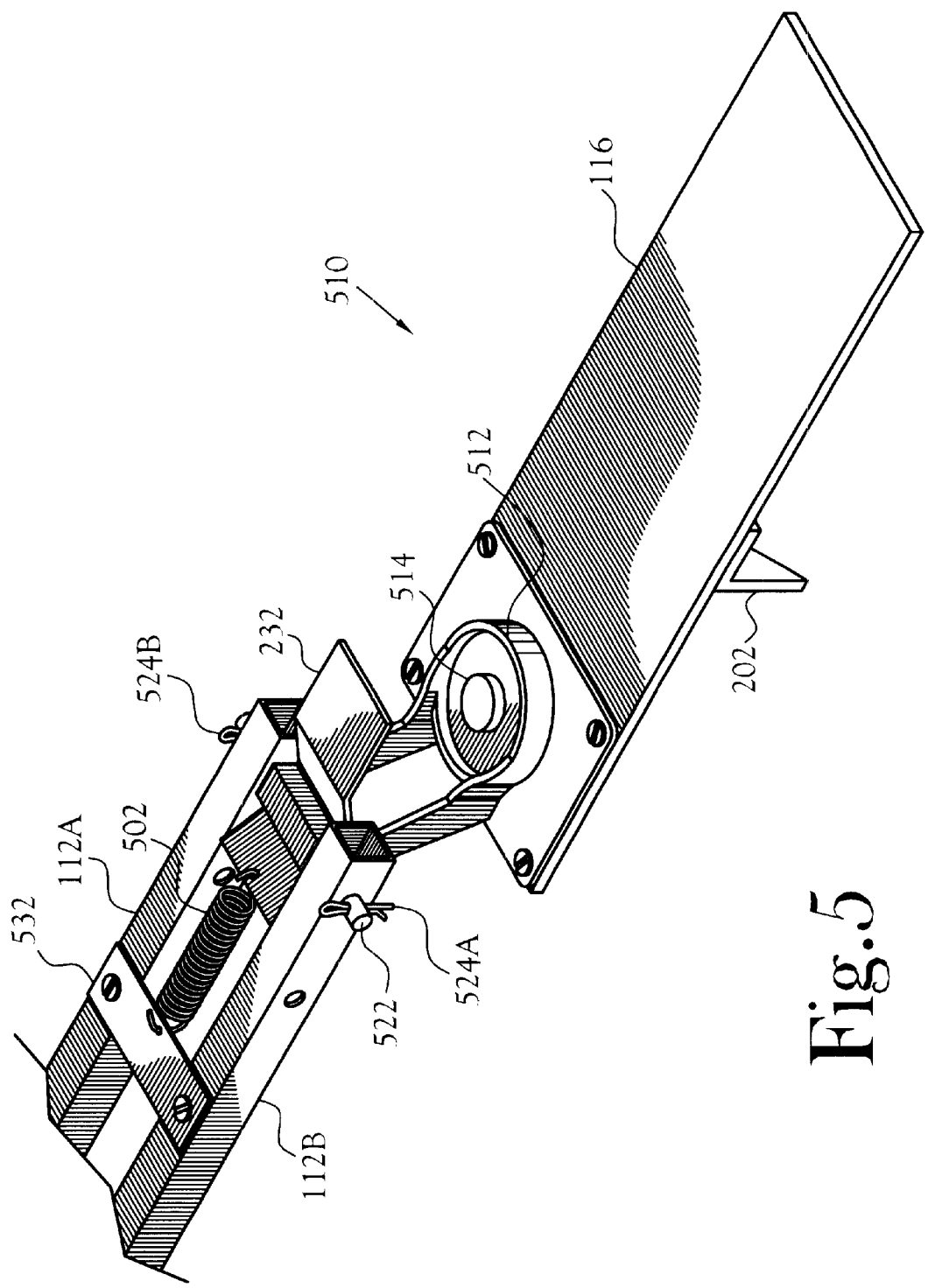
FIG. 5 is a perspective view of a foot plate showing the pivot and swivel attachment to the plate.

FIG. 5 illustrates a foot plate assembly 510 showing the foot plate 116 and its connection to the lever arm 112. The bottom surface of the foot plate 116 has a cleat 202, which serves to anchor the plate 116 to the ground. Those skilled in the art will recognize that the cleat 202 configuration will vary depending upon the surface on which the plate 116 is used. For soil, in one embodiment the cleat 202 is a blade formed from a section of angle and in another embodiment, the cleat 202 has prongs, which are embedded into the ground. For hard surfaces such as concrete or tile, instead of a protruding cleat 202, the cleat is a resilient material with a tread that grips the surface and prevents sliding of the foot plate 116.

Attached to the foot plate 116 is a swivel 512, which is, in turn, attached to the lever arm 112, which, in the illustrated embodiment, is made up of a pair of tube members 112A, 112B. The means for connecting the lever arm 112 to the foot plate 116 includes the swivel 512 that rotates the lever arm 112 about a swivel pin 514 such that the lifting head 102 can be moved in a circle centered about the swivel pin 514. The swivel 512, in one embodiment, is similar to a caster, but without the wheel, and mounted upside-down to the plate 116. The lever arm members 112A, 112B; connect to the swivel 512 with a pivot pin 522 such that the lever arm 112 pivots vertically relative to the foot plate 116. In the illustrated embodiment, the pivot pin 522 has an axis that is substantially parallel to a plane defined by the foot plate 116. In the illustrated embodiment, the pivot pin 522 is secured with cotter pins 524A, 524B, although one skilled in the art will recognize that any of various means can be used to secure the pivot pin 522 in place.

The foot plate assembly 510 includes a lifting plate 232 under which the operator 210 places his toes in order to lift the foot plate assembly 510. In the illustrated embodiment, the center portion of the lifting plate 232 has an opening for the pivot pin 522 and serves as a spacer for the pair of tube members 112A, 112B. The opposite end of the lifting plate 232 has a spring 502 connected between a support 532 and the plate 232. The spring 502 secures the plate 232 in an elevated position. If the plate 232 is stepped on by the operator 210, the spring 502 prevents the plate 232 from being bent and allows the plate 232 to return to a position suitable for lifting the foot plate assembly 510.

FIG. 6 illustrates the attachments of the lever arm (second member) 112 and the lifting arm (third member) 106 to the lifting head shaft (first member) 104. The lifting arm 106 has a series of openings 604A of which two of the openings have pins 602, 612. The opening 604A not being used by a pin 602, 612 allows for adjustment of the angle of the lifting arm 106 relative to the lifting head shaft 104. Other openings (not illustrated) in the lifting head shaft 104 allow the combined length of the lifting arm 106 and the lifting head shaft 104 to be varied.

A pivot pin 612 passes through the two tube members 106A, 106B of the lifting arm 106 and through a corresponding opening in the lifting head shaft 104. A stop pin 602 passes through the two tube members 106A, 106B of the lifting arm 106 and rests against the lifting head shaft 104 when the handle 108 is pushed down by the operator 210. In the illustrated embodiment, the pins 602, 612 are secured with cotter pins, although one skilled in the art will recognize that any of various means can be used to secure the pins 602, 612 in place. The pivot pin 612 allows the lifting arm 106 and the lifting head shaft 104 to move relative to each other in a limited manner. In another embodiment, the lifting arm 106 and the lifting head shaft 104 are fixed. relative to each other.

FIG. 6 illustrates the joint attaching the lever arm 112 to the lifting head shaft 104, which is shown in section in FIG. 3. The lever arm members 112A, 112B are secured to the lifting head shaft 104 with a pin 312, which allows the lever arm 112 to rotate about an axis of the shaft 104 and to change the angle of the lever arm 112 relative to the shaft 104. The operator 210, by grasping and twisting the handle 108, rotates the lifting head shaft 104, and the lifting head 102. The amount of rotation is limited by the opening 304 in the shaft 104. In one embodiment, the rotation is 90°, which allows the lifting head 102 to move from a horizontal position to a vertical position, relative to the axis of the shaft 104. The lever arm members 112A, 112B have additional openings 606A, 606B through which the pivot pin 302 can be inserted to adjust the length of the lever arm 112 and, consequently, the distance between the pivot pin 302 and the swivel 512 on the foot plate 116. Those skilled in the art will recognize that numerous openings can be used to allow a wide range of adjustment without departing from the spirit and scope of the present invention.

From the foregoing description, it will be recognized by those skilled in the art that a portable hand-operating lifting device has been provided. The device allows movement of the lifting head within a circle centered about a fixed point on a foot plate. The lifting head can be forced under items or into the ground, and the object lifted can be deposited, in one embodiment, by rotating the lifting head and allowing the lifted item to slide off of the head.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus, and illustrative examples shown and described. Accordingly, departures may be made from such details without departing from the spirit or scope of applicant's general inventive concept.

Having thus described the aforementioned invention, we claim:

1. An apparatus for lifting, said apparatus comprising:
   a first member having a first end rigidly attached to a lifting head and having a second end opposite said first end, said first member having a joint including an opening in said first member and a pin engaging said opening, said opening defined by a first surface substantially perpendicular to an axis of said first member and a second surface substantially parallel to said first surface, said opening having a pair of slotted apertures along a circumference of said first member, a portion of said pin extending from each one of said pair of slotted apertures;
   a second member having a pair of side members, each one of said pair of side members disposed on an opposite side of said first member, each one of said pair of side members having a thru-opening engaging said pin whereby said second member pivots relative to said axis of said first member and said first member rotates axially relative to said second member;
   a handle attached to said second end of said first member; and
   a first plate having a surface, said second member connected to said first plate.

2. The apparatus of claim 1 wherein said second member is connected to said first plate with a swivel, said swivel having an axis of rotation that intersects a plane defined by said surface of said first plate.

3. The apparatus of claim 1 wherein said second member is connected to said first plate with a pivot between said second member and said first plate, said pivot having a pivot axis substantially parallel to said plane defined by said surface of said first plate.

4. The apparatus of claim 1 further including a second plate extending above a portion of said first plate and being substantially parallel to said first plate, said second plate having a second plate pivot allowing said second plate to move toward said first plate, said second plate being restrained from moving away from said first plate.

5. The apparatus of claim 1 further including at least one cleat affixed to a lower surface of said plate.

6. The apparatus of claim 1 further including a third member between said first member and said handle.

7. The apparatus of claim 6 further including an adjustable connection between said third member and said first member.

8. The apparatus of claim 6 further including an adjustable connection between said third member and said handle.

9. An apparatus for lifting, said apparatus comprising:
   a first member having a first end rigidly attached to a lifting head and having a second end opposite said first end, said first member having a joint including an opening in said first member and a pin engaging said opening, said opening defined by a first surface substantially perpendicular to an axis of said first member and a second surface substantially parallel to said first surface, said opening having a pair of slotted apertures along a circumference of said first member, said pin extending from each one of said pair of slotted apertures;
   a second member having a pair of side members, each one of said pair of side members disposed on an opposite side of said first member, each one of said pair of side members having a thru-opening engaging said pin whereby said second member pivots relative to said axis of said first member and said first member rotates axially relative to said second member;
   a handle attached to said second end of said first member;
   a first plate having at least one cleat protruding from a surface of said first plate;
   a swivel connecting said second member to said first plate, said swivel having an axis of rotation that intersects a plane defined by said surface of said first plate;
   a pivot between said second member and said first plate, said pivot having a pivot axis substantially parallel to said plane defined by said surface of said first plate; and
   a second plate extending above a portion of said first plate and being substantially parallel to said first plate, said second plate having a second plate pivot allowing said second plate to move toward said first plate, said second plate being restrained from moving away from said first plate.

10. The apparatus of claim 9 further including a third member between said first member and said handle, said third member having an adjustable connection to said first member.

11. The apparatus of claim 9 further including a third member between said first member and said handle, said third member having an adjustable connection to said handle.

* * * * *